United States Patent Office 3,285,263
Patented Nov. 15, 1966

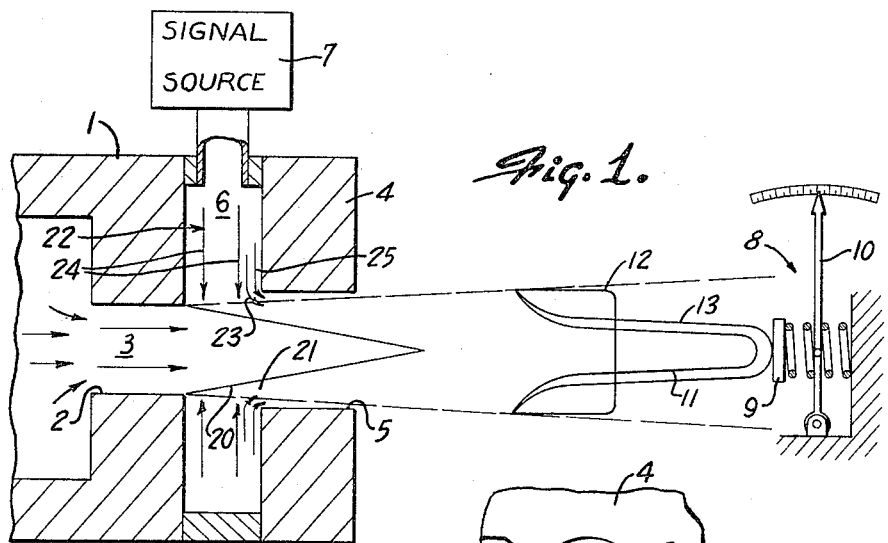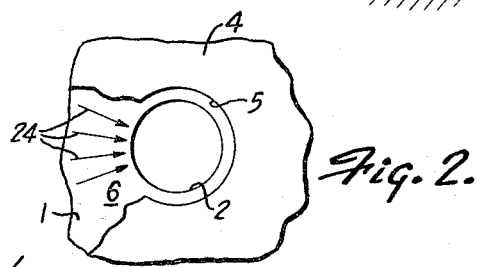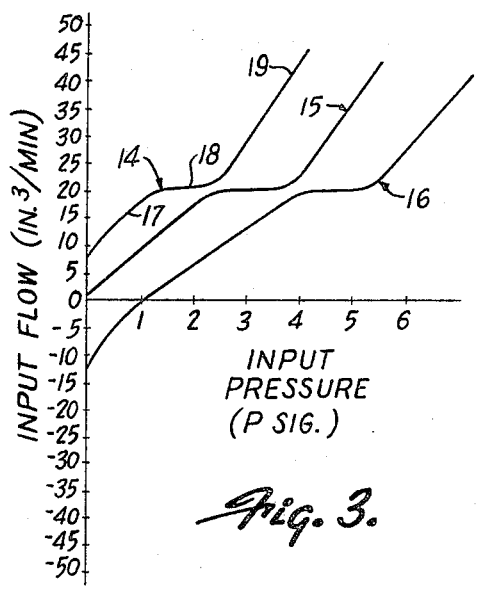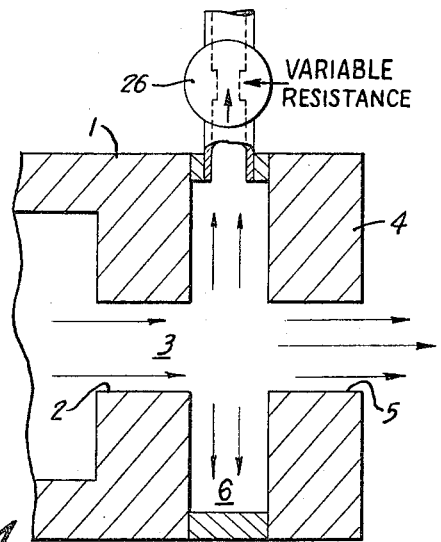

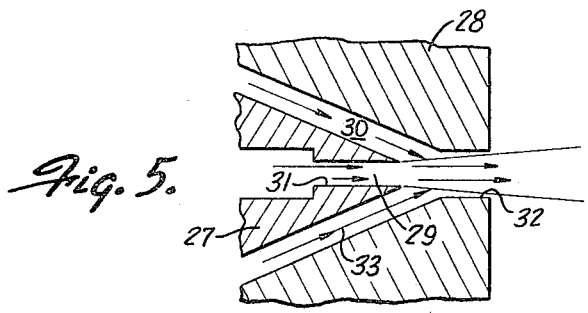
Fig. 5.
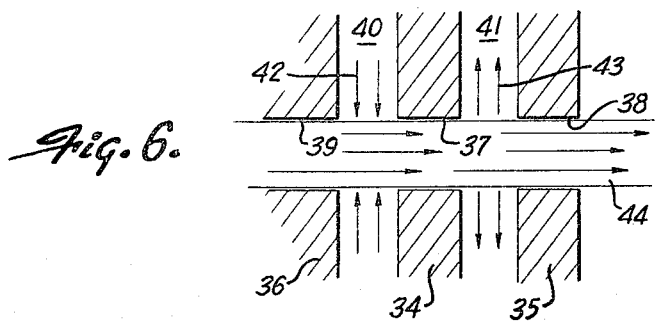
Fig. 6.
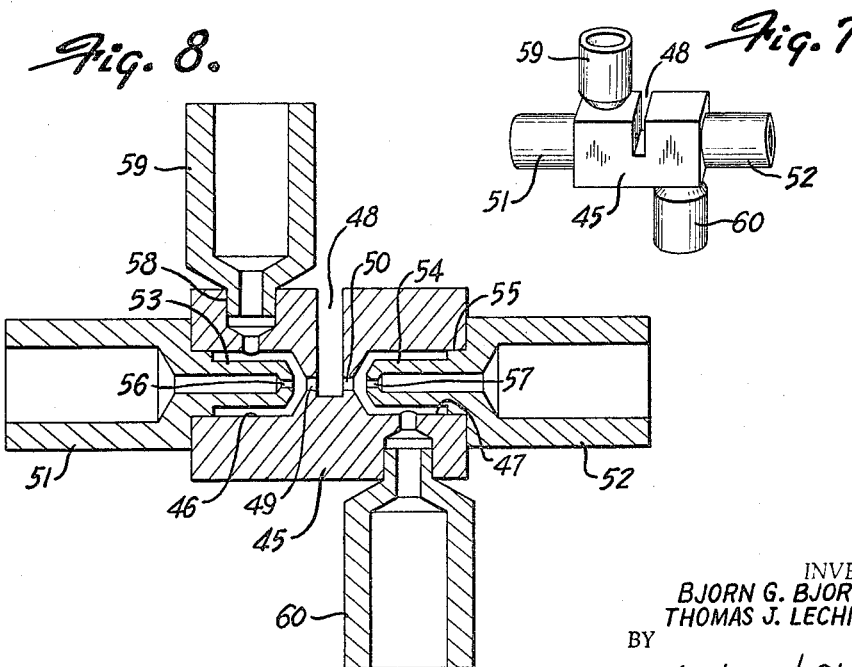
Fig. 8.
Fig. 7.
INVENTORS.
BJORN G. BJORNSEN
THOMAS J. LECHNER, JR.
BY
Andrus & Starke
ATTORNEYS

3,285,263
INPUT FLUID CONTROL APPARATUS
Bjorn G. Bjornsen, Milwaukee, and Thomas J. Lechner, Jr., Menomonee Falls, Wis., assignors to Johnson Service Company, Milwaukee, Wis., a corporation of Wisconsin
Filed Nov. 1, 1963, Ser. No. 320,681
11 Claims. (Cl. 137—81.5)

This invention relates to fluid control apparatus and particularly to a pure fluid control means for controlling the strength of a power stream.

Fluid control and operating systems are widely employed in various industrial and other control fields or systems such as machine tool, steam engines, internal-combustion rocket and airplane devices and in many other applications. Generally, pneumatic or hydraulic controls have employed cooperating mechanical devices such as linkages, valves, diaphragms and vanes to provide a control of the fluid stream.

Recent developments have been directed toward pure fluid devices employing perpendicularly interacting and deflecting fluid streams one of which constitutes a supply-output signal stream which exists between a supply orifice and one or more collector orifices, the other of which constitutes a control signal stream which is directed from an orifice to strike the main stream at an angle of ninety degrees and determines the alignment of the main stream with the collector orifice. Such devices thus operate on the principle of deflecting the supply-output stream at the point of perpendicular intersection with the control stream for varying the collection of the main stream.

The prior art in connection with pure fluid devices has employed either of two alternate deflection principles; a transverse stream deflection principle or a boundary layer deflection principle.

In the transverse stream deflection control, a main power stream or jet is directed through a closed chamber from its emitter orifice to a collector orifice. A transverse control stream or jet is directed against the side thereof to deflect the power jet with respect to the collector orifice. Assuming no splash or bounce of the interacting fluid stream, momentum is conserved and the main jet is deflected with respect to the collector orifice. The high strength jet can be controlled with a much lower strength control stream and consequently the device provides pure fluid amplification.

In the boundary layer deflection type control of prior art fluid devices, the high energy jet is fed through a closed chamber between an emitter orifice and a pair of collector orifices. In this type, however, a predetermined wall configuration is provided to control the pressure distribution in the jet boundary layer region such that the power jet deflects and locks onto one or the other of the walls of the confining passage. Deflection from normal flow is established by a control jet or stream flowing along the wall causing the stream to deflect and lock onto the opposite wall.

Prior art deflection devices have a limited signal gain and the input signal impedance is generally relatively low. Further, in deflection devices, the transverse momentum of the deflecting stream required for a given or desired deflection of a power stream depends upon the momentum of the power stream.

The present invention is particularly directed to a completely new and novel fluid control which provides for changing the momentum flux of a main stream in its axial direction, with or without amplification, and not requiring deflection or change of direction of the main stream. In the present invention, the change in flux modulation for a given input signal is substantially independent of the strength of the main stream. Furthermore, the input impedance can be controlled to include the highly desired characteristics of an infinite input impedance.

In accordance with this invention for controlling stream strength, a main stream passes through a control chamber or space having an atmosphere created by an input signal and acting on the stream for controlling or changing the strength of the stream at a reference pressure region to the stream discharge side of the control chamber. This controlled atmosphere can also effect the momentum flux distribution of the stream by modification of the boundary layer of the controlled stream. A control signal orifice is provided concentric with the stream to be controlled and defines the region of the controlled atmosphere. Control fluid is introduced in the control space between the power stream orifice and the control signal orifice for action on the stream changing the strength distribution in a controlled manner.

A power stream emitting from the power orifice maintains its momentum flux with the axial pressure gradient equal to zero. If fluid is added radially to the stream, the momentum flux will remain constant but the stream will expand with the flux distribution changed over the increased cross-section of the stream. In accordance with this invention, the pressure of the control atmosphere determines the fluid added.

Further, when the fluid added includes an axial momentum flux in the direction of the power stream, it will be added to the momentum flux of the power stream, thereby additionally changing the distribution by changing the total momentum flux. A pressure gradient can be established in the axial direction of the main stream through the control orifice to the reference pressure at the discharge side of the orifice. This pressure gradient also changes the momentum flux.

The above factors more or less contribute to the total control action depending on the particular design of the system. The configuration and location of the control orifice will, for example, effect the degree of the various control actions.

Applicants have found for example that a very important and novel control feature results from selected relationship of orifices and stream strengths wherein there is no change in the signal flow for changes in input signal pressures. The latter functioning is the characteristic of a high input impedance. Although a small fixed signal flow may generally exist in this mode of operation, the input power required to drive the device is small. This type of control establishes a pressure control system and is closely analogous to the electric potential control of the plate current of a vacuum tube control grid having a high input impedance with the corresponding advantages. For example, the high input impedance permits sensing signals from weak power sources because of the negligible loading offered by the high input impedance.

The present invention thus provides an improved fluid responsive means and apparatus having a controllable impedance for controlling the momentum strength distribution or magnitude of a fluid stream. The structure of the present invention can be made small and compact and without highly critical tolerances in the size, shape and location of the fluid orifices.

The many advantages, objects and modes of operation of the present invention are more fully developed in connection with the description of the accompanying drawings furnished herewith.

In the drawings:

FIG. 1 is a diagrammatic view of a modulator and a receiving means illustrating the present invention;

FIG. 2 is an elevational end view of the modulator shown in FIG. 1;

FIG. 3 is a set of curves showing signal pressure versus signal flow obtained with a device constructed in accordance with the present invention;

FIG. 4 is a view similar to FIG. 1 illustrating another embodiment of the invention;

FIG. 5 is a view illustrating an embodiment of the invention wherein the control signal is introduced into a control chamber at an angle;

FIG. 6 is a view similar to FIG. 1 showing a plurality of control streams for controlling a power stream;

FIG. 7 is a pictorial view of a control unit incorporating the present invention; and FIG. 8 is a vertical section through the unit of FIG. 7.

Referring particularly to FIG. 1, a control unit employing a unique fluid control signal of a main fluid stream is shown. A power stream nozzle 1 includes a supply orifice 2 for establishing a main or power stream 3 which may be employed to operate a load or a fluid amplifying system such as disclosed in applicant's copending application entitled, Fluid Control Apparatus, which has been filed on the same date as this application and is assigned to a common assignee. A control nozzle 4 is spaced forwardly of nozzle 1 and includes a control orifice 5 which is shown in FIG. 1 concentrically located with respect to stream 3. The space between control nozzle 4 and the power stream nozzle 1 defines a control gap or chamber 6 through which stream 3 passes and which is connected to a suitable control fluid signal means 7. The latter means may be any suitable construction which is adapted to create a control fluid atmosphere of flow and/or pressure within the chamber 6 and will generally be an adjustable or varying means. The signal means 7 has therefore been shown by an appropriately labeled block.

The atmosphere created by the signal means 7 within the control gap or chamber 6 can be a positive or negative pressure and flow with a positive condition shown in FIG. 1 by arrows directed toward stream 3. For purposes of discussion, a positive pressure is any pressure above atmospheric and a negative pressure that below atmospheric. The atmosphere symmetrically impresses itself across the stream 3 and directly controls the stream 3 entering the control orifice such that changes in the character of the atmosphere are reflected in stream 3 to the output side of orifice 5.

A three dimensional flow pattern is shown in FIG. 1 and the atmosphere within chamber 6 is concentrically applied to the stream. In a two dimensional system, the atmosphere would be similarly symmetrically applied in the corresponding plane.

The characteristics of this novel device for a given input signal, including the input impedance and the modulation of the main stream strength distribution appearing at the exit or discharge side of orifice 5, is generally dependent upon the selection and arrangement of the four variables including the main stream orifice, the signal stream orifice, the spacing between these two orifices and the pressure of the main stream. The present invention may be designed to have a low input impedance; that it, an appreciable change in signal flow with changes in signal pressure, with a high input impedance or with an intermediate impedance. For example, the impedance of the device will be directly related to leakage of the atmosphere in the control chamber 6 through the control orifice 5 which in turn will depend upon the relative diameters of the main stream 3 and the control orifice 5. The length or thickness of the control orifice and the wall configuration with respect to the boundary of the stream will effect the change in the output stream strength for changes in the atmosphere in the control chamber 6. The effect of these variables will be apparent to those skilled in the art from the subsequent description of the embodiments of the invention given in the drawings.

A suitable receiving means such as a strength measuring means 8 shown diagrammatically in FIG. 1 as a sail 9 connected to a force transducer 10 is positioned downstream of the control orifice 5 within the discharge space or atmosphere and in the path of stream 3. The output of the force transducer 10 is equal to that part of the momentum flux of stream 3 acting on the sail 9. The output will then be related to the profile of the stream 3 at the sail 9.

In the operation of the device such as shown in FIG. 1, variations in the control signal stream or atmosphere are reflected in the main stream to change the strength, the momentum flux profile or both; for example, at the sail 9. The sail 9 cannot distinguish the manner in which the force it measures changes. That is, the change may be due to either a change in the total strength or in merely a change in the distribution of the strength. If a profile at the sail 9 has a configuration shown by line 11, the sail receives and transmits a large signal. If the atmosphere in chamber 6 changes the profile 11 by a lateral expansion and blunting of the nose profile, while the total momentum flux stays the same, such as shown by line 12, the sail is subjected to and measures a substantially smaller force as a result in the reduction of the momentum flux over the area of the sail. However, if the atmosphere in chamber 6 changes the momentum flux in the stream 3 aligned with sail 9, with or without a lateral change of the profile, as at 13, the sail 9 will respond to and measure this increase.

The profile at the sail 9 may be changed by changes in the atmosphere as a result of any one or a combination of the following phenomena which appears to accurately describe the functional aspects of this invention, depending upon the precise construction. The pressurized atmosphere in the control gap 6 may introduce fluid radially into the main stream 3. The main stream will expand and redistribute the momentum flux over an increased cross-sectional area without changing the total momentum flux of stream 3 within the control space. The strength profile seen by the control orifice is thereby changed and the momentum flux distribution of the stream emitted from the control orifice 5 and seen by the measuring device 8 is varied. Thus, if the stream expands radially outwardly of the inner control orifice edges, a portion of the stream engages the control nozzle 4 and only the central stream portion is transmitted. This will reduce the momentum flux seen downstream of control orifice 5 by the measuring device.

The expansion of the momentum flux profile may also provide a reverse action with respect to the receiving means 8. Thus, if the sail 9 is laterally offset with respect to the axis of stream 3 such that it lies to one side of the high velocity portion of profile 11, it will register a minute momentum flux. However, profile expansion to that of profile 12, by fluid which enters radially, will substantially increase the momentum flux measured by sail 9. The amount of the fluid added in this manner and the change in the profile will be dependent upon the pressure of the atmosphere in chamber 6. Additionally, the pressure in the chamber 6 will be generally different than that of the discharge space and establishes a pressure gradient through the control orifice in an axial direction. This pressure gradient is normally reflected in an acceleration of the stream 3 and a corresponding change in the total momentum flux of the stream 3 between the inlet and outlet sides of the control orifice. In this control aspect, the size, location and configuration of the control orifice can be understood to effect the precise characteristic as it will obviously change the pressure gradient therethrough. As hereinafter described, however, in one operational condition, the throat pressure of the supply orifice 2 must also be considered.

The fluid of the control signal may also be added to stream 3 with an axial component of momentum flux. The latter flux component will be added to that of the main stream and increase the total momentum flux of the stream 3 downstream of control orifice 5 as well as change its profile because of additional fluid. This control will likewise be affected by the size and configuration of the control orifice relative to the stream. Thus, the shape and size may determine whether or not an axial component of signal flow exists. Of course, if desired, the signal can be angularly directed such as shown in FIG. 5 to produce an axial component.

FIG. 3 is a set of three characteristic curves 14, 15 and 16 for one device constructed in accordance with this invention and includes signal flow on the vertical axis and signal pressure on the horizontal axis. The three curves show essentially the same characteristic for different power stream pressures. The curves were obtained with a pair of concentric orifices 2 and 5 having respective diameters of 0.016 and 0.020 inch which were spaced from each other by substantially 0.020 inch. Air was employed to produce the main stream 3 and the control atmosphere in chamber 6. Curves 14–16 correspond to input supply pressures of 22, 26 and 30 pounds per square inch gauge (p.s.i.g.), respectively.

Referring to curve 14, it includes an initial inclined portion 17 wherein input flow increases with signal pressure increased from 0 to a low input pressure of 1.5 p.s.i.g., a second essentially horizontal portion 18 from the latter signal pressure to an increased signal pressure of 2.5 p.s.i.g. and a final inclined portion 19 from the latter to the maximum signal pressure shown. Similarly, curves 15 and 16 include inclined and horizontal portions with changes in the input pressures in the control chamber 6.

Referring again particularly to FIG. 1, the several portions of the curves of FIG. 3 may be explained in terms of the previously described action of the atmosphere and the geometry of the device, as follows. The main or power stream 3 may, in accordance with presently known fluid dynamics, be considered to include two components; namely, a potential flow portion 20, shown by a velocity cone, and an outer boundary layer portion 21, shown by outer dotted stream limit lines in FIG. 1. The extent or shape of portions 20 and 21 of a stream 3 passing through a similar fluid atmosphere is determined, for a given supply orifice 2, by the pressure of the stream source. In FIG. 1, the control orifice 5 is shown larger than the adjacent stream to more clearly show the effects of a change in boundary layer by addition or subtraction of control fluid from the control atmosphere.

In FIG. 1, the atmosphere of the reference chamber 6 is created by an input signal or control stream 22 from any suitable pressurized fluid source 7. The atmosphere is concentrically impressed about the main power stream 3 within the chamber 6 and determines the strength of stream 3 as seen by the measuring device 8. The control stream 22 can be considered to include three components shown diagrammatically by lines 23, 24 and 25. The one portion 23 of control stream 2 may be added to stream 3. The stream portion 23 has an axial flow component parallel to the main stream and therefore has axial momentum which is added to the axial momentum flux of stream 3 and results in an increased total stream strength.

The portion of the stream shown by line 24 is radially directed into the stream 3. This increases the mass of the stream and increases the cross-sectional area thereof with a resulting distribution and change of the momentum flux profile within the control space. Additionally, the radial pressure of the atmosphere creates a proportional static stream pressure within the control space different than that outside of orifice 5 and a pressure gradient through the orifice 5. This causes positive or negative acceleration depending upon the direction of the pressure gradient and causes a corresponding change in the momentum flux which will be measured by the measuring device 8.

The third component or portion 25 of control stream 22 passes between the boudary layer circumference and the wall of orifice 5 and a portion which is not entrained constitutes a leakage flow which does not effect the main or power stream 3. The portion 25 which is entrained acts in the manner of the previously described portion 23 because of its axial momentum.

The fluid control system as shown in FIG. 1 provides a controllable input impedance system as a result of the controllable leakage. The input impedance of the device is determined by the change in signal flow for a given unit change in signal pressure.

The apparatus as shown in FIG. 1 has the expanded stream 3 closely approaching the wall of the control orifice 5 and permitting partial or small leakage. This illustrates an intermediate impedance position. If orifice 5 is much enlarged, the atmosphere in chamber 6 more freely escapes and a very low impedance results. A very high input impedance can also be obtained by reducing or eliminating leakage in accordance with the following principle of operation, explained as presently understood.

As the signal flow into the main stream increases, the stream expands and engages the wall of the control orifice 5. Further, increases in fluid flow will saturate the flow through the control orifice 5 and thereafter, the flow of control stream 22 remains essentially constant with increases in signal pressures, as shown by the horizontal portions 18 of curves 14–16 in FIG. 3. The device thus exhibits essentially an infinite input impedance in this region.

When the device was operated to produce the horizontal portion of these curves, the stream 3 as seen by a measuring device 8 was weakened by increasing signal pressure, in spite of the increased pressure gradient through the control orifice; which may be explained as follows. The mass through the supply orifice 2, in accordance with known fluid dynamics, is independent of the downstream pressure in the control space 6 as long as the pressure of the stream at the supply orifice due to the pressure in the control space is less than about 53% of the supply pressure. However, if the control pressure increases above this level, a reduction in the main flow results. In general, when this occurs, this reduction in main flow will be in excess of the acceleration of the main stream contributed by the pressure gradient through the control orifice, causing a weakening of the stream as seen by a measuring device 8. This action was observed in the device yielding the curves of FIG. 3.

A further increase in signal pressure continues to reduce the supply flow until the flow through the control orifice 5 is no longer saturated, at which point the signal flow continues to increase with increased pressure. This results in an increase in the strength of the stream 3 as seen by the measuring device 8.

The high impedance characteristic may also be explained as a result of the combined action of the power stream and the control stream in reducing the effective exit opening of the control orifice. For example, the curve 15 was obtained with the main supply stream pressure of essentially 26 pounds per square inch gauge and the control orifice had a diameter of 0.020 inch. However, the input flow was that which the control signal would have created through an orifice of only 0.008 inch. The input impedance which is related to the square of the diameter of a control orifice was thus increased by a factor in excess of six.

The operation of the device with a high or infinite input control feature represents a tremendous step forward in the art, theory and design of pure fluid devices.

Saturated flow can be obtained by properly dimensioning the control orifice relative to the main stream dimension. For example, the control orifice may be made sufficiently small such that the main stream flow alone furnishes saturated flow through the control orifice without additional fluid from the control space. Reducing the space or gap between the orifices and/or increasing the main stream pressure will in general reduce the effective size of the control orifice, in a similar manner thus representing an increased impedance to the input fluid signal.

Furthermore, the control system may employ a negative pressure control signal as previously noted; for example, as shown in FIG. 4. The illustrations of FIGS. 1 and 4 are similar and corresponding elements in the two embodiments are similarly numbered for simplicity and clarity of explanation.

The control space or chamber 6 between the nozzles 1 and 4 is closed and connected by adjustable restrictor 26 to the atmosphere. The main stream 3 in flowing through the control space 6 entrains fluid from the control space which thus escapes through the control orifice 5 to the outside, thus establishing a negative pressure. The magnitude of the negative pressure is controlled by changing the degree of entrainment by opening and closing the restrictor 26.

This establishes a controllable negative pressure atmosphere in the control space which uniformly impresses itself on the main stream 3 to control the profile and magnitude of the momentum flow of the stream emerging from the control orifice, as heretofore discussed.

In FIG. 5, concentric main and control nozzles 27 and 28 are formed to produce a main stream 29 passing through a control space or chamber 30 between a power orifice 31 and a control orifice 32. However, the control space 30 generally defines an annular cone-shaped space with a control signal 33 creating an atmosphere which uniformly impresses itself about the main stream 29. The control flow possesses an axial momentum flux component within the control space in the direction of the main stream 29. The fluid in the control space which is added to the main stream 29 will therefore increase the total momentum flux, generally as heretofore discussed.

Referring to FIG. 6, a control system is shown employing a plurality of control orifice members 34 and 35 spaced forwardly from each other and from a power stream orifice member 36. The members 34–36 include similar orifices 37, 38 and 39, respectively, which are aligned with each other. The two spaces or gaps between the several members are control gaps or chambers 40 and 41, as in FIG. 1, with corresponding control signal streams 42 and 43 creating atmospheres which impress themselves uniformly about a main or power stream 44 passing through the gaps. In this particular embodiment, stream 42 is assumed to be a positive pressure and stream 43 a negative pressure, as shown by the oppositely directed arrows.

FIG. 6 illustrates high input impedances and further illustrates cascading of control orifices which produces multiple pneumatic grids similarly to a multiple grid electronic device.

The main power stream regulation wherein the control stream or atmosphere is applied directly and symmetrically to the main stream generally is seen to control both the input signal impedance from a low impedance to a very high impedance and further to control the amplitude and profile of momentum flow or flux of the main stream. The change in stream strength and the change in profile can also be employed to directly control a working or power stream. The rate of change of momentum flux measured by a measuring device downstream of the control orifice will in general inversely relate to the magnitude of the input impedance in this invention. However, the high impedance feature is an extremely valuable and novel feature in design of pure fluid devices in that when used with pure fluid measuring devices such as for instance the impacting streams device of applicants' previously identified copending application, furnishes a pure fluid device comparable to an electronic cathode follower.

This invention provides a very flexible impedance control system in that manufacturing tolerances can readily be compensated by adjustment of the supply pressure.

In the drawings, FIGS. 7 and 8 illustrate a small integrated unit incorporating the input control of the invention and the high gain impacting power streams of applicants' previously referred to copending application.

In FIGS. 7 and 8, a solid metal body 45 is shown symmetrically formed except as hereinafter described about a vertical center line with opposed cylindrical openings 46 and 47 on opposite sides of the body 45 defining a signal chamber and an output or collector chamber. In an actual structure, the body 45 was generally about a one-inch cube; illustrating the compactness and miniaturization possible with the present invention.

A reference space is defined by a vertical slot 48 extending downwardly from the top surface of body 45 between the openings 46 and 47. Aligned orifices 49 and 50 in the opposite walls of the reference chamber or space 48 constitute a signal orifice and a collector orifice respectively. Power stream supply pipes or nozzles 51 and 52 are similarly secured within the openings 46 and 47 and are adapted to create impacting fluid streams. The supply pipes 51 and 52 each include reduced inner ends 53 and 54 integrally secured to the main body portion by a stepped construction, as at 55. The stepped portion fits tightly within the outer end of the corresponding opening to provide a fluid tight joint. The inner ends 53 and 54 project through the corresponding openings and terminate in power stream orifices 56 and 57 spaced from an aligned with the signal orifice 49 and the output orifice 50. The adjacent innermost ends of openings 46 and 47 and corresponding pipe ends 53 and 54 conically conform to establish a signal gap encircling the pipe 51 and having a signal gap and an output gap.

A tap opening 58 is provided in the top of body 45 in FIGS. 7 and 8 and communicates with the control chamber or gap. A control signal tap or pipe 59 is secured within the opening 58 and connected to any suitable source of a control fluid signal.

An output signal pipe 60 is similarly provided in the bottom side of the body 45 communicating with the output chamber.

The input control signal stream supplied via tap 59 controls the main power stream emitted from the orifice 56, as heretofore discussed. This controlled stream impacts with the opposing stream from the power stream orifice 57 to establish an output signal at tap 60, as more fully described in applicants' previously referred to copending application.

In the illustrated embodiments of the invention, a symmetrical three dimensional open flow system has been illustrated. However, if desired, a closed or semi-closed two or three dimensional flow pattern can also be employed within the scope of the present invention by the provision of suitable confining walls in the construction of the unit of the several chambers. However, the control signal stream is to be supplied to act uniformly on the power stream to directly control its strength and not merely to function as a stream deflecting control. A two dimensional flow system, for example, can be employed with the control signal impressed on opposite sides of the power stream to establish a uniform pressure gradient across the stream such that the strength of the power stream is changed without changes in the direction of flow, and the reference chamber can be any suitable static pressure, within the scope of this invention. Further, as employed herein, a fluid stream may include any suitable gas, liquid, mixtures thereof, and may include solid particles which do not prevent flow through the orifices.

Generally, it can also be stated that the alignment of the orifices is not critical and the control orifice axis can be angularly arranged with respect to the main stream orifice axis, the concentric and aligned illustrations herein being given for simplicity of explaining the present invention.

Further, the present invention has been described in connection with a receiving means of explain certain functional aspects therein. However, the control in itself may provide thrust modulation of a jet.

The present invention particularly provides a highly improved fluid signal control means for producing a high input impedance with the corresponding functional similarity and advantages of electronic devices.

Various modes of carrying out the invention are contemplated as being within the scope of the following claims particularly pointing out and distinctly claiming the subject matter which is regarded as the invention.

We claim:
1. In a fluid control system,
   (a) means to establish a power stream having an axial flow path, said power stream having a single boundary filled with fluid to form a continuous stream, and
   (b) means to establish a control signal uniformly and symmetrically impressed upon the power stream to control the momentum flux thereof without deflection of the power stream from the axial path as a result of said control signal.
2. In a pure fluid control system,
   (a) a reference chamber having means to pass a power stream therethrough between an inlet orifice and a discharge control orifice, said power stream having a single boundary filled with fluid to form a continuous stream, said reference chamber having a control atmosphere therein symmetrically and uniformly impressed upon the power stream and changing the momentum flux of the emitted power stream without deflection of the power stream from its axial flow path as a result of said control signal.
3. In a pure fluid stream control device,
   (a) a main power stream supply member having a power stream forming orifice, said orifice forming a power stream having a single boundary filled with fluid to form a continuous stream,
   (b) a plurality of control orifice members secured in spaced relation to each other and to said supply member and having orifices aligned with the power stream forming orifice, and
   (c) means for establishing a control signal fluid within the spacing of said members and uniformly impressing of the control signal fluid on all the free surfaces of the power stream for controlling the strength thereof.
4. The pure fluid stream control device of claim 3 having said control orifices related to the diameter of the power stream to control the input impedance of the corresponding control orifice.
5. The pure fluid stream control device of claim 3 having said power stream essentially saturating flow through the control orifices and thereby establishing a high input impedance at the control orifices to the corresponding control signal fluid.
6. In a fluid control device,
   means including a stream supply orifice and a spaced control orifice defining a control chamber through which a main stream passes from the supply orifice and through the control orifice, said main stream having a single boundary filled with fluid to form a continuous stream, said means also including a reference chamber to the output side of the control orifice, said reference chamber having side walls laterally spaced from the control orifice such that a free stream is emitted from the control orifice into the reference chamber, and
   a signal means to establish a control signal in the control chamber uniformly and symmetrically impressed on the main stream to control the momentum flux of the free stream.
7. The fluid control system of claim 6 wherein said control orifice is greater than said supply orifice and the control stream is algebraically added to the boundary layer of the power stream.
8. The pure fluid device of claim 6, having
   (a) means to introduce the control signal stream into the control chamber with a momentum flux component parallel to the main stream.
9. The pure fluid stream control device of claim 6 wherein said control orifice and said supply orifice are of essentially the same diameter.
10. The fluid control device of claim 6, wherein said signal means is variable and said control orifice is selected to establish an operating range changing the momentum flux of the free stream in response to a change in the signal pressure without essentially any change in the signal flow.
11. The fluid control device of claim 10 wherein said control orifice further establishes further operating ranges to either side of the first operating range wherein the input flow changes with changes in the signal pressure.

References Cited by the Examiner

UNITED STATES PATENTS

| | | | |
|---|---|---|---|
| 3,030,979 | 4/1962 | Reilly | 137—81.5 |
| 3,039,490 | 6/1962 | Carlson | 137—81.5 |
| 3,078,675 | 2/1963 | Baldwin | 137—81.5 X |
| 3,080,886 | 3/1963 | Severson | 137—81.5 |
| 3,122,165 | 2/1964 | Horton | 137—81.5 |
| 3,128,040 | 4/1964 | Norwood. | |
| 3,159,168 | 12/1964 | Reader | 137—81.5 |
| 3,170,476 | 2/1965 | Reilly | 137—81.5 |

OTHER REFERENCES

"Binary Logic Device," A. E. Mitchell, I.B.M. Technical Disclosure Bulletin, volume 6, No. 4, Sept. 1963, pages 91, 92.

M. CARY NELSON, *Primary Examiner.*

S. SCOTT, *Assistant Examiner.*